United States Patent
Sheih et al.

(10) Patent No.: US 9,699,225 B2
(45) Date of Patent: *Jul. 4, 2017

(54) REAL-TIME MEDIA OPTIMIZATION OVER REMOTED SESSIONS

(71) Applicant: Microsoft Technology Licensing, LLC, Redmond, WA (US)

(72) Inventors: Guo-Wei Sheih, Sammamish, WA (US); Srivatsa K. Srinivasan, Renton, WA (US); Senthil K. Velayutham, Sammamish, WA (US); Rajneesh Mahajan, Woodinville, WA (US); Subhashri Iyer, Sammamish, WA (US); Humayun Khan, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/976,030

(22) Filed: Dec. 21, 2015

(65) Prior Publication Data

US 2016/0112468 A1    Apr. 21, 2016

Related U.S. Application Data

(63) Continuation of application No. 12/967,100, filed on Dec. 14, 2010, now Pat. No. 9,276,972.

(51) Int. Cl.
*G06F 15/16* (2006.01)
*H04L 29/06* (2006.01)

(52) U.S. Cl.
CPC ...... *H04L 65/1069* (2013.01); *H04L 65/4023* (2013.01)

(58) Field of Classification Search
CPC . H04L 51/32; H04L 67/306; G06F 17/30867; G06F 15/17306; G06F 17/30011; G06Q 50/01; G06Q 30/0241
See application file for complete search history.

(56) References Cited

U.S. PATENT DOCUMENTS

| 8,890,874 | B2 | 11/2014 | Mahajan et al. |
| 9,276,972 | B2 | 3/2016 | Sheih et al. |
| 2006/0069797 | A1 | 3/2006 | Abdo et al. |
| 2007/0156257 | A1 | 7/2007 | Peters |
| 2008/0080568 | A1 | 4/2008 | Hughes |
| 2008/0146256 | A1 | 6/2008 | Hawkins |

(Continued)

FOREIGN PATENT DOCUMENTS

| CN | 1694527 | 11/2005 |
| CN | 10184163 A | 9/2010 |

(Continued)

OTHER PUBLICATIONS

Chinese Notice of Allowance in Application No. 201110436692.0, mailed Jul. 11, 2016, 4 pages.

(Continued)

*Primary Examiner* — John B Walsh

(57) ABSTRACT

Real-time media optimization may be provided. First, a remote session may be established with a remote computing device. Then, during the remote session, non-real-time media data may be exchanged with the remote computing device over a server path. Moreover, real-time media data may be exchanged with the remote computing device over a media path during the remote session.

20 Claims, 5 Drawing Sheets

(56) References Cited

U.S. PATENT DOCUMENTS

| | | | |
|---|---|---|---|
| 2008/0209021 | A1 | 8/2008 | Shamma |
| 2009/0030976 | A1 | 1/2009 | Shukla et al. |
| 2009/0113066 | A1 | 4/2009 | Van Wie et al. |
| 2009/0288007 | A1 | 11/2009 | Leacock et al. |
| 2010/0146085 | A1 | 6/2010 | Van Wie et al. |
| 2010/0232319 | A1 | 9/2010 | Hyoudou |
| 2010/0274848 | A1 | 10/2010 | Altmaier et al. |
| 2010/0287548 | A1 | 11/2010 | Zhou et al. |
| 2012/0151008 | A1 | 6/2012 | Sheih et al. |
| 2015/0281348 | A1 | 10/2015 | Van Wie et al. |

FOREIGN PATENT DOCUMENTS

| | | |
|---|---|---|
| CN | 102362269 | 2/2012 |
| CN | 101420375 | 5/2012 |
| EP | 1228641 | 8/2003 |
| JP | 2007-048005 | 2/2007 |
| JP | 2012-511213 | 5/2012 |
| RU | 2315436 | 1/2008 |
| WO | 01/57678 | 8/2001 |

OTHER PUBLICATIONS

Japanese Notice of Allowance in Application No. 2013-544511, mailed Jun. 27, 2016, 3 pages. (No English Translation).
Chinese Fourth Office Action dated Sep. 6, 2015 in Application No. 201110436692.0, 10 pages.
Chinese Fifth Office Action dated Mar. 18, 2016 in Application No. 201110436692.0, 6 pages.
European Communications dated Jul. 8, 2014 in Application No. 118489513.7-1853, 1 page.
European Office Action dated Feb. 26, 2016 in Application No. 118489513.7-1853, 5 pages.
Russian Notice of Allowance dated Mar. 1, 2016 in Application No. 2013127119, 11 pages. (No translation submitted).
U.S. Notice of Allowance dated Aug. 31, 2015 in U.S. Appl. No. 12/967,100, 5 pages.
U.S. Amendment and Response filed Nov. 23, 2015 in U.S. Appl. No. 12/967,100, 8 pages.
U.S. Notice of Allowance dated Jan. 29, 2016 in U.S. Appl. No. 12/967,100, 3 pages.
U.S. Appl. No. 12/967,100, filed Dec. 14, 2010 entitled "Real-Time Media Optimization Over Remoted Sessions".
Citrix, "Optimizing HDX Technologies for XenDesktop 4," Published Date: May 10, 2010, https://support.citrix.com/servlet/KbServlet/download/23686-102-646022/Best%20Practices%20for%20Optimizing%20HDX%20Technologies%20for-%20XenDesktop%204.pdf, pp. 1-31.
Blue Coat, "Application Performance Brief: VMware Applications," Published Date: Aug. 2009, http://www.bluecoat.com/doc/8743, 2 pgs.
Jozsef Vass, "Stratus Service for Developing End-to-End Applications using RTMFP in Flash Player 10," Published Date: Apr. 26, 2010, http://www.adobe.com/devnet/flashplayer/articles/rtmfp_stratus_app.html, 7 pgs.
"Adobe Flash Media Server 3.5," Published Date: Nov. 2008, http://imageready.info/products/flashmediaserver/pdfs/fms3_5_wp_ue.pdf, pp. 1-58.
Zhigang Chen et al., "Real Time Video and Audio in the World Wide Web," Published Date: 1996.
Bill Birney et al., "Sourcing Content from Remote Storage," Published Date: Sep. 2003, http://www.microsoft.com/windows/windowsmedia/howto/articles/SourcingRemoteContent.aspx, 6 pgs.
Fast Streaming, "Windows Media Player is Better Together With Windows Media Services," Retrieved Date: Sep. 28, 2010, http://www.microsoft.com/windows/windowsmedia/technologies/bettertogether.aspx, 4 pgs.
International Search Report dated Jun. 28, 2012 cited in Application No. PCT/US2011/062269, 9 pgs.
Chinese First Office Action dated Feb. 26, 2014 cited in Application No. 201110436692.0, 14 pgs.
European Supplementary Search Report dated Jun. 20, 2014 cited in Application No. 11848951.7, 8 pgs.
Chinese Second Office Action dated Nov. 15, 2014 cited in Application No. 201110436692.0, 11 pgs.
Chinese Third Office Action dated Jun. 5, 2015 cited in Application No. 201110436692.0, 16 pgs.
Australian Office Action Issued in Patent Application No. 2011341522, Mailed Date: Aug. 26, 2015, 2 Pages.
Chinese Action Issued in Patent Application No. 201110436692.0, Mailed Date: Sep. 6, 2015, 11 Pages.
Japanese Office Action dated Oct. 16, 2015 in Application No. 2013-544511, 6 pgs. (with English Translation).
Russian Office Action dated Nov. 20, 2015 in Application No. 2013127119, 4 pgs. (No translation submitted).
U.S. Official Action dated Aug. 27, 2012 in U.S. Appl. No. 12/967,100, 21 pgs.
U.S. Official Action dated Jul. 11, 2013 cited in U.S. Appl. No. 12/967,100, 17 pgs.
U.S. Official Action dated Jul. 31, 2014 cited in U.S. Appl. No. 12/967,100, 24 pgs.
U.S. Official Action dated Dec. 24, 2014 cited in U.S. Appl. No. 12/967,100, 23 pgs.
U.S. Official Action dated Apr. 9, 2015 cited in U.S. Appl. No. 12/967,100, 13 pgs.
Australian Exam Report in Application 2016200543, mailed Feb. 7, 2017, 3 pgs.

REAL-TIME MEDIA OPTIMIZATION OVER REMOTED SESSIONS

CROSS-REFERENCE TO RELATED APPLICATIONS

This application is a continuation application and claims priority to U.S. patent application Ser. No. 12/967,100, now issued U.S. Pat. No. 9,276,972, filed Dec. 14, 2010, entitled "Real-Time Media Optimization Over Remoted Sessions," which application is incorporated herein by reference in its entirety.

BACKGROUND

Videoconferencing uses telecommunications of audio and video to bring people at different sites together for a meeting. This can be as simple as a conversation between two people in private offices (point-to-point) or involve several sites (multi-point) with more than one person in large rooms at different sites. Besides the audio and visual transmission of meeting activities, videoconferencing can be used to share documents, computer-displayed information, and whiteboards.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Real-time media optimization may be provided. First, a remote session may be established with a remote computing device. Then, during the remote session, non-real-time media data may be exchanged with the remote computing device over a server path. Moreover, real-time media data may be exchanged with the remote computing device over a media path during the remote session.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
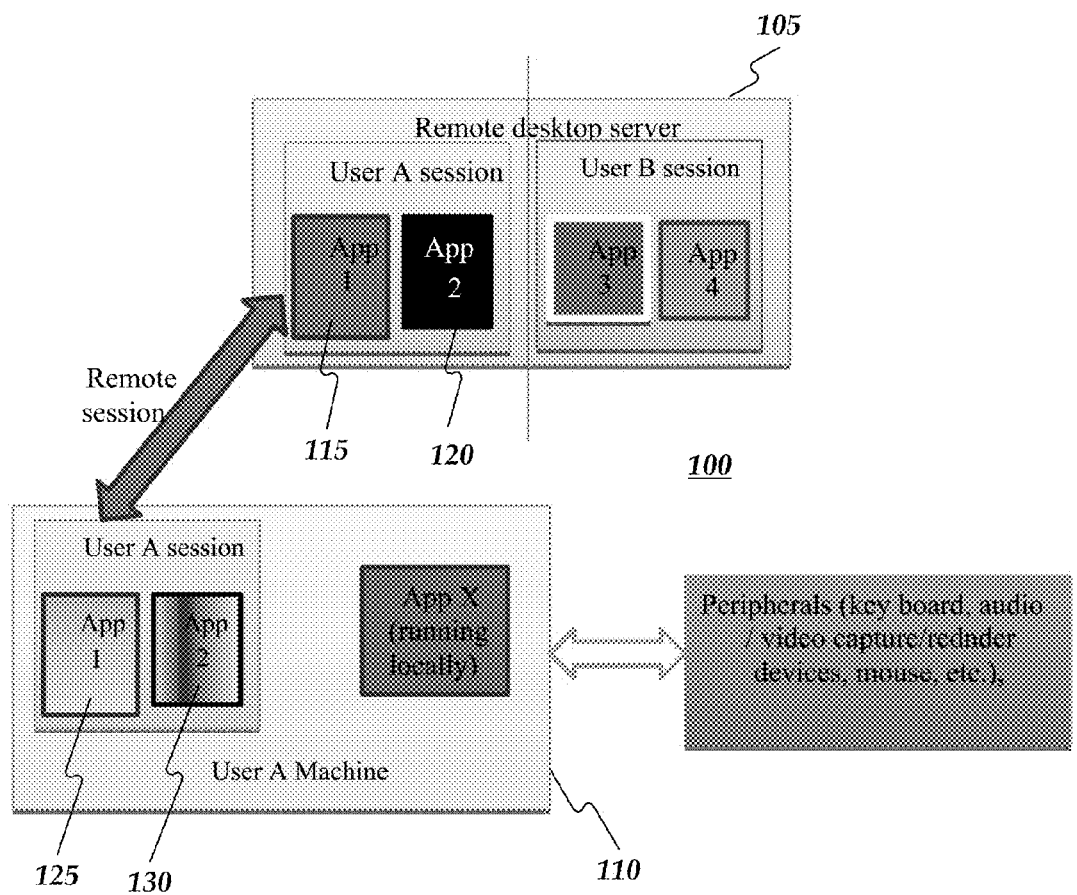
FIG. 1 is a block diagram of a virtualized environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Desktop virtualization may be used by enterprises that have sensitive data and applications and cannot afford (e.g. security reasons) for the sensitive data or applications to reside on a client side machine. Consequently, with desktop virtualization, a thin client my run on the client side machine with the sensitive data and applications running on a server controlled by the enterprise. In this situation, the application is actually running on the server and all the user sees is just a user interface (UI) on the client side machine. Accordingly, a system administrator with the enterprise may update the server side image. Then, when a user logs into the server, the user gets the latest software that the system administrator wants to push.

FIG. 1 is a block diagram of a virtualized environment 100. As illustrated in FIG. 1, with desktop virtualization, the actual processing may be done on a server 105 instead of a client-side machine 110. Such applications (i.e., applications running in virtualized environment 100) may be referred to as "virtualized applications." For example, a first application 115 and a second application 120 may actually be running on server 105. Client-side machine 110 may render and display a first user interface 125 and a second user interface 130 respectively corresponding to first application 115 and a second application 120. Virtualized applications may be acceptable for non-real-time applications (e.g. word processing, spreadsheets, etc.) in which raw data (e.g. key inputs, etc.) may be sent from the client-side machine to the server where the virtualized application running on the server gets the user input and process the data.

Real-time audio/video conferencing applications may run as virtualized applications in the aforementioned virtualized environment. Real-time audio/video conferencing applications may take raw audio/video data captured from the client-side machine, encode the data, and transmit the encoded data over a wire for example. In addition real-time audio/video conferencing applications may receive an encoded data stream from a network, decode the encoded data stream, and render the decoded data stream on the client-side machine. However, with virtualized real-time audio/video conferencing applications, there are additional hops (e.g. through the server) that the "virtualized" real time application needs to traverse compared to "non-virtualized" real time application running locally on the client-side machine.

When sending and receiving real-time audio/video in a non-virtualized real time application, all the processing is done on client-side machines and not on a server. For example, the client-side application catches audio/video from the devices, encodes, and sends it over a wire from the client-side machine. In contrast to non-virtualized, with the virtualized real-time application, the captured raw audio/video data may be sent to the server, for example, by remoting the capturing device or by sending a raw data stream coming from capturing devices over a remote desktop channel to the server. Moreover, the server in the virtualized environment sends out an encoded stream. Consequently, in the virtualized environment, there are additional hops (e.g. from the client-side machines to the server) in the path of audio/video. These additional hops may increase delay/latency in the real-time audio/video data flow.

Figure 2:
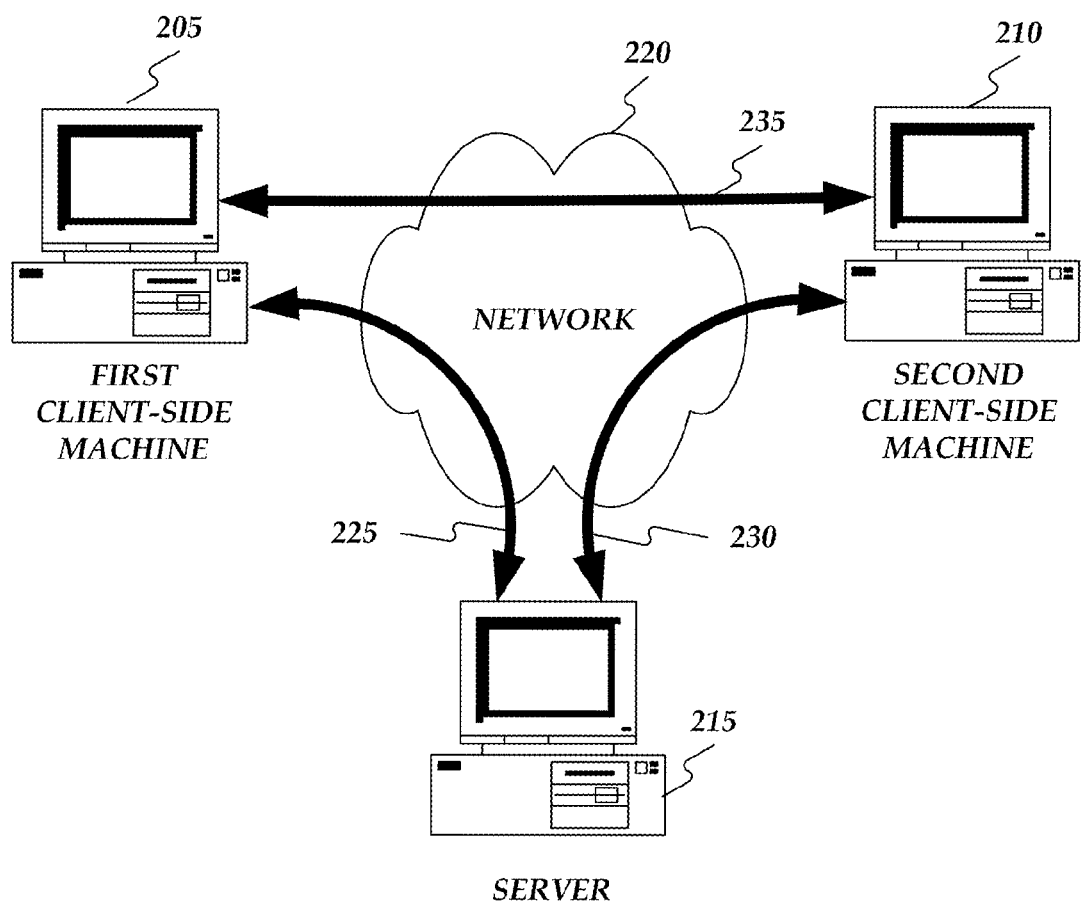
FIG. 2 is a block diagram of a real-time media system.

FIG. 2 shows a real-time media system 200 consistent with embodiments of the inventions. Real-time media system 200 may comprise a first client-side machine 205 (e.g. a local computing device), a second client-side machine 210 (e.g. a remote computing device), a server 215, and a network 220. Consistent with embodiments of the invention, non-virtualized, real-time audio/video conferencing may be performed between first client-side machine 205 and second client-side machine 210 over network 220.

If embodiments of the invention used a server path (i.e. a first hop 225 and a second hop 230), there would be additional hops (e.g. from first client-side machine 205 to server 215 and from server 215 to second client-side machine 210) in the path of the audio/video data between first client-side machine 205 and second client-side machine 210. These additional hops may increase, for example, delay/latency in the real-time audio/video data flow between first client-side machine 205 and second client-side machine 210.

Consistent with embodiments of the invention, the aforementioned delay/latency in the real-time audio/video data flow between first client-side machine 205 and second client-side machine 210 may be avoided by not involving server 215 in the real-time audio/video data flow. For example the audio/video data may be transmitted between first client-side machine 205 and second client-side machine 210 over a media path 235 that does no involve server 215. However, if media path 235 is not established or if it fails after it is established, the audio/video data may be transmitted between first client-side machine 205 and second client-side machine 210 over the server path.

Any one of first client-side machine 205, second client-side machine 210, and server 215 may comprise, but is not limited to, a desktop computer, a notebook computer, a mobile device, a smart telephone, or a personal digital assistant, for example. Network 220 may comprise the internet or any type network over which first client-side machine 205, second client-side machine 210, and server 215 may communicate. Any one of first client-side machine 205, second client-side machine 210, and server 215 may be implemented using, for example, a computing device 500 as described in greater detail below with respect to FIG. 5.

Figure 3:
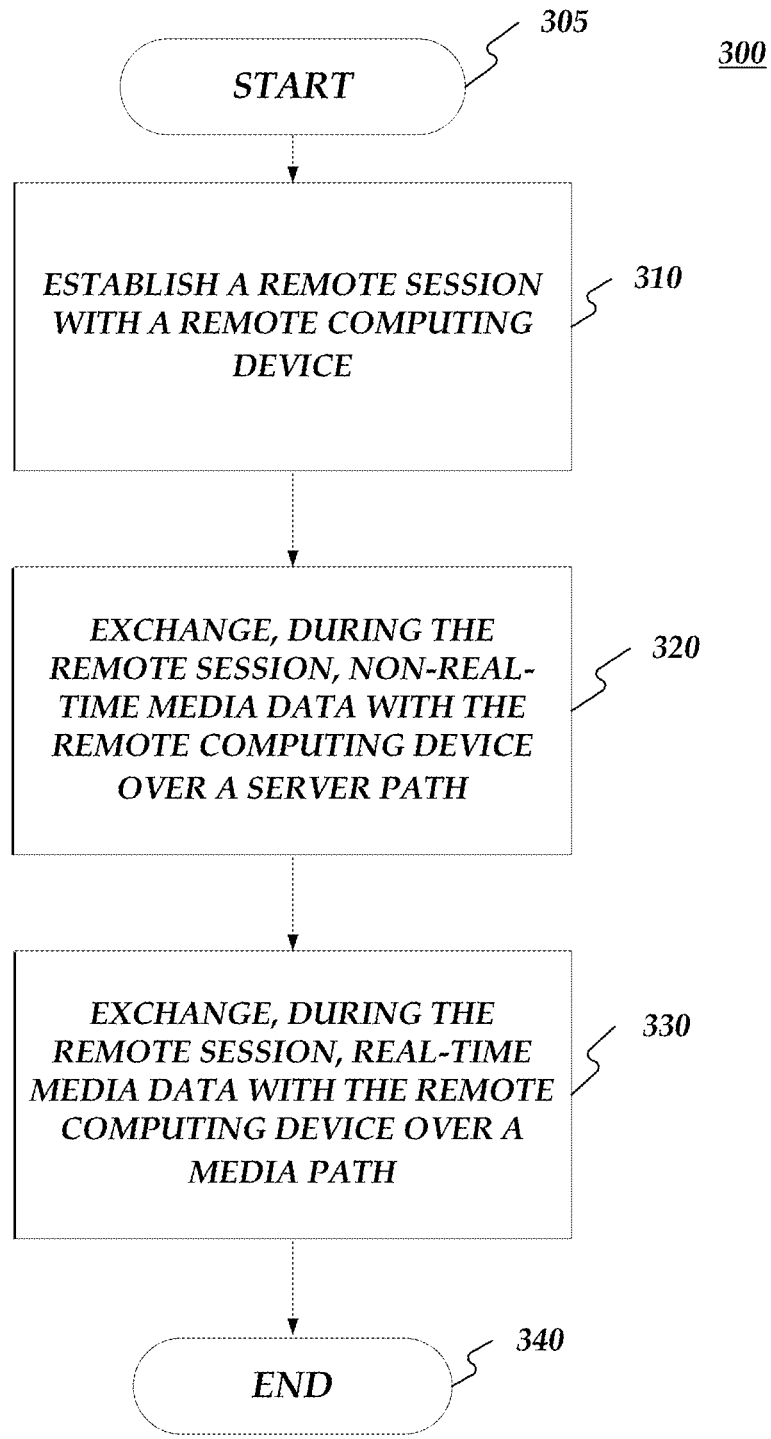
FIG. 3 is a flow chart of a method for providing real-time media optimization.

FIG. 3 is a flow chart setting forth the general stages involved in a method 300 consistent with an embodiment of the invention for providing real-time media optimization. Method 300 may be implemented using real-time media system 200 as described above. Ways to implement the stages of method 300 will be described in greater detail below.

Figure 4:
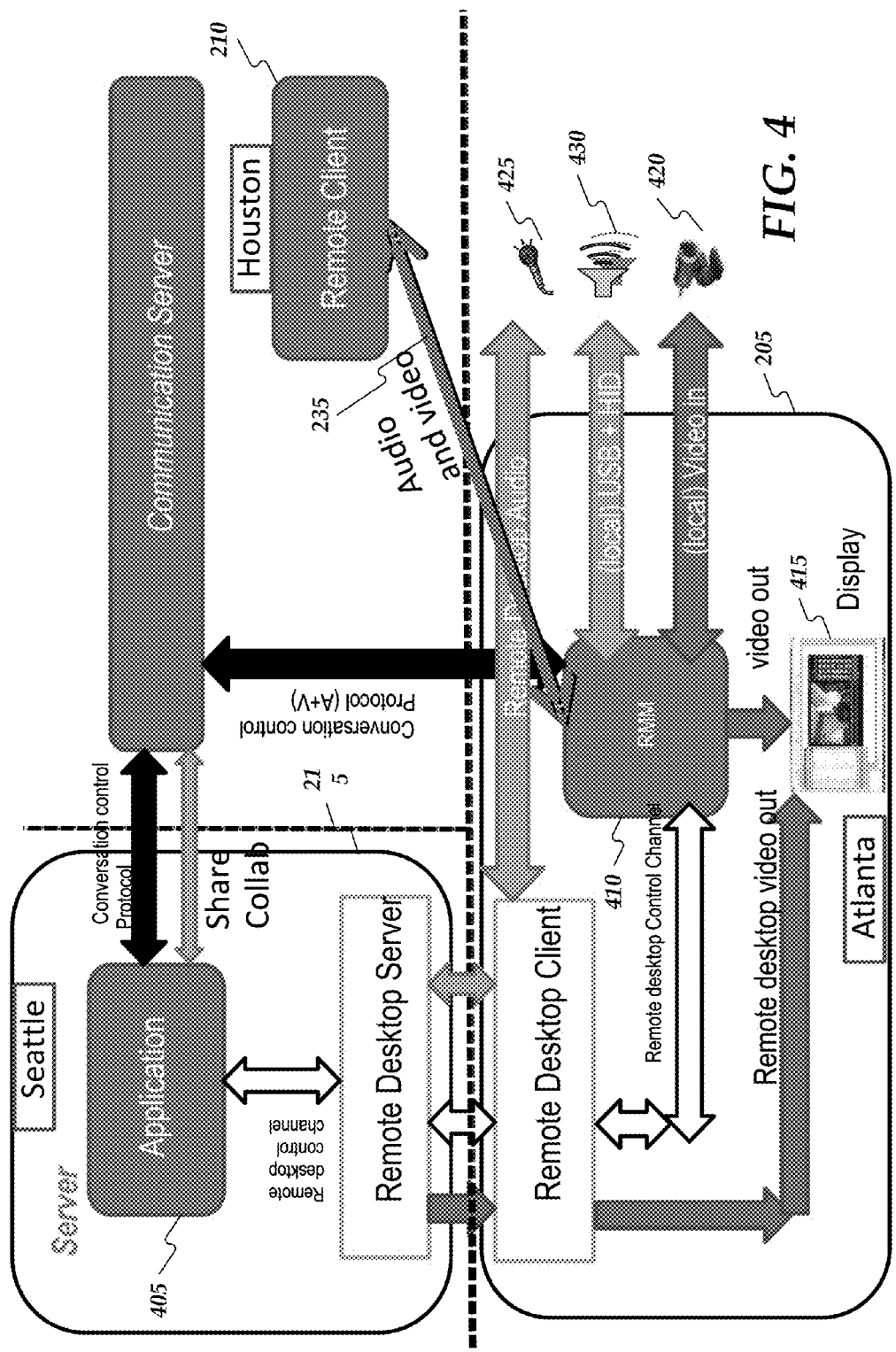
FIG. 4 is a block diagram of a real-time media system.

Method 300 may begin at starting block 305 and proceed to stage 310 where first client-side machine 205 may establish a remote session with a remote computing device (e.g. second client-side machine 210.) For example, as shown in FIG. 4, an application 405 may be running on sever 215. Application 405 may comprise a videoconferencing application. Consistent with the remote session, a thin client running on first client-side machine 205 may render and display a user interface 415 corresponding to application 405 running on sever 215. Application 405 may complete a remote session between first client-side machine 205 and second client-side machine 210.

From stage 310, where first client-side machine 205 establishes the remote session, method 300 may advance to stage 320 where first client-side machine 205 may exchange, during the remote session, non-real-time media data with the remote computing device (e.g. second client-side machine 210) over the server path. For example, the exchanged non-real-time media data may comprise, for example, any non-audio or non-video data corresponding to a videoconferencing session between first client-side machine 205 and second client-side machine 210. For example, the non-real-time media data may comprise data corresponding to a location of first client-side machine 205 used, for example, for emergency 911 calls. The non-real-time media data may comprise, but is not limited to, client and server capabilities. These capabilities may be used to influence the direct communication between two clients.

Once first client-side machine 205 exchanges the non-real-time media data in stage 320, method 300 may continue to stage 330 where first client-side machine 205 may exchange, during the remote session, real-time media data with the remote computing device over media path 235. The real-time media data may comprise audio or video data. If embodiments of the invention used the server path (i.e. first hop 225 and second hop 230) for the real-time media data, there would be additional hops (e.g. from first client-side machine 205 to server 215 and from server 215 to second client-side machine 210) in the path of the audio/video data between first client-side machine 205 and second client-side machine 210. These additional hops may increase, for example, delay/latency in the real-time audio/video data flow between first client-side machine 205 and second client-side machine 210.

Embodiments of the invention may avoid the aforementioned delay/latency by having a remote media manager (RMM) (e.g. a remote media manager application 410) on first client-side machine 205 that may capture, encode, and transmit the real-time media data (e.g. audio/video and other modalities can be added) directly from first client-side machine 205 to second client-side machine 210, without involving server 215 in media path 235. Moreover, RMM may receive encoded real-time media data from network 220 (e.g. sent directly from second client-side machine 210 over media path 235), decode the received encoded real-time media data, and render directly into user interface 415 the decoded real-time media data it received from second client-side machine 210. RMM may work in conjunction with application 405 on server 215. For example, application 405 may send and receive data using input devices (e.g. a camera 420 and a microphone 425) and output devices (e.g. a speaker 430) connected to first client-side machine 205. RMM may also utilize the same input and output devices. Consequently, RMM may work in conjunction with application 405 on server 215 in order to share input and output devices. In other words, the input and output devices may be shared between data sent/received over media path 235 and data sent/received over the server path.

Another instance where RMM may work in conjunction with application 405 on server 215 is where data from media path 235 and data from the server path is synchronized. On example may comprise geometry tracking. Geometry tracking may allow for (when video data is coming straight to first client-side machine 205 sent directly from second client-side machine 210 over media path 235 and bypassing the server path) placing, on display 415, the video where it should be shown. For example, application 405 may send the position and shape of the video region to first client-side machine 205 on the server path. First client-side machine 205 may then render the video (coming on media path 235) on a "proxy" window that tracks information (e.g. position and shape)

sent by application 405. Application 405 may continuously monitor any changes that may happen to the video location and shape and may keep updating first client-side machine 205 with this information. First client-side machine 205 in-turn may keep updating the "proxy" window with application 405's info. In this way, the video display on first client-side machine 205 may be synchronized.

Furthermore, first client-side machine 205 exchanging, during the remote session, real-time media data with the remote computing device over media path 235 may comprise performing network address translation (NAT) from first client-side machine 205 to the remote computing device. In computer networking, network address translation (NAT) may comprise the process of modifying network address information in datagram (IP) packet headers while in transit across a traffic routing device for the purpose of remapping one IP address space into another. After first client-side machine 205 exchanges the real-time media data in stage 330, method 300 may then end at stage 350.

An embodiment consistent with the invention may comprise a system for providing real-time media optimization. The system may comprise a memory storage and a processing unit coupled to the memory storage. The processing unit may be operative to establish a remote session with a remote computing device. Moreover, the processing unit may be operative to exchange, during the remote session, non-real-time media data with the remote computing device over a server path and exchange, during the remote session, real-time media data with the remote computing device over a media path.

Another embodiment consistent with the invention may comprise a system for providing real-time media optimization. The system may comprise a memory storage and a processing unit coupled to the memory storage. The processing unit may be operative to establish a remote session between a local computing device and a remote computing device. In addition, the processing unit may be operative to exchange, during the remote session, non-real-time media data between the local computing device and the remote computing device over a server path including a server. Furthermore, the processing unit may be operative to exchange, during the remote session, real-time media data comprising audio and video data between the local computing device and the remote computing device over a media path. The server is not in the media path.

Yet another embodiment consistent with the invention may comprise a system for providing real-time media optimization. The system may comprise a memory storage and a processing unit coupled to the memory storage. The processing unit may be operative to establish a remote session with a remote computing device. The processing unit being operative to establish the remote session may comprise the processing unit being operative to establish a server path wherein a server is involved in the server path, and to establish a media path wherein the server is not involved in the server path and the media path is established directly with the remote computing device. Moreover, the processing unit may be operative to exchange, during the remote session, non-real-time media data with the remote computing device over the server path and to exchange, during the remote session, real-time media data with the remote computing device over the media path.

Figure 5:
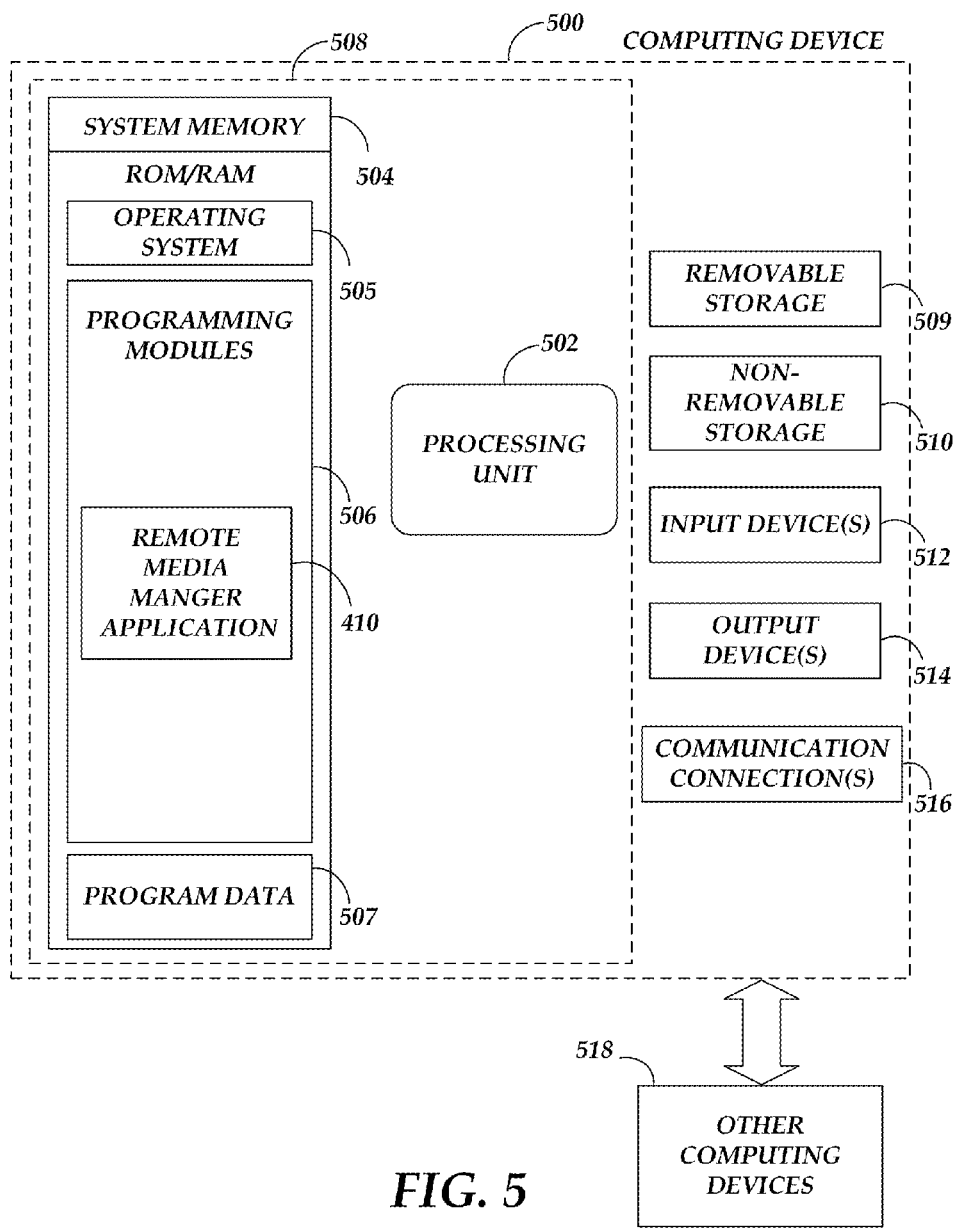
FIG. 5 is a block diagram of a system including a computing device.

FIG. 5 is a block diagram of a system including computing device 500. Consistent with an embodiment of the invention, the aforementioned memory storage and processing unit may be implemented in a computing device, such as computing device 500 of FIG. 5. Any suitable combination of hardware, software, or firmware may be used to implement the memory storage and processing unit. Moreover, computing device 500 may run in a virtual machine or on a physical machine. For example, the memory storage and processing unit may be implemented with computing device 500 or any of other computing devices 518, in combination with computing device 500. The aforementioned system, device, and processors are examples and other systems, devices, and processors may comprise the aforementioned memory storage and processing unit, consistent with embodiments of the invention. Furthermore, computing device 500 may comprise an operating environment for first client-side machine 205 or second first client-side machine 210 as described above. First client-side machine 205 or second first client-side machine 210 may operate in other environments and is not limited to computing device 500.

With reference to FIG. 5, a system consistent with an embodiment of the invention may include a computing device, such as computing device 500. In a basic configuration, computing device 500 may include at least one processing unit 502 and a system memory 504. Depending on the configuration and type of computing device, system memory 504 may comprise, but is not limited to, volatile (e.g. random access memory (RAM)), non-volatile (e.g. read-only memory (ROM)), flash memory, or any combination. System memory 504 may include operating system 505, one or more programming modules 506, and may include a program data 507. Operating system 505, for example, may be suitable for controlling computing device 500's operation. In one embodiment, programming modules 506 may include, for example, remote media manager application 410. Furthermore, embodiments of the invention may be practiced in conjunction with a graphics library, other operating systems, or any other application program and is not limited to any particular application or system. This basic configuration is illustrated in FIG. 5 by those components within a dashed line 508.

Computing device 500 may have additional features or functionality. For example, computing device 500 may also include additional data storage devices (removable and/or non-removable) such as, for example, magnetic disks, optical disks, or tape. Such additional storage is illustrated in FIG. 5 by a removable storage 509 and a non-removable storage 510. Computing device 500 may also contain a communication connection 516 that may allow device 500 to communicate with other computing devices 518, such as over a network in a distributed computing environment, for example, an intranet or the Internet. Communication connection 516 is one example of communication media.

The term computer readable media as used herein may include computer storage media. Computer storage media may include volatile and nonvolatile, removable and non-removable media implemented in any method or technology for storage of information, such as computer readable instructions, data structures, program modules, or other data. System memory 504, removable storage 509, and non-removable storage 510 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 500. Any such computer storage media may be part of device 500. Computing device 500 may also have input device(s) 512 such as a keyboard, a mouse, a pen, a sound input device, a touch input device, etc. Output device(s) 514 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As stated above, a number of program modules and data files may be stored in system memory 504, including operating system 505. While executing on processing unit 502, programming modules 506 (e.g. remote media manager application 410) may perform processes including, for example, one or more method 300's stages as described above. The aforementioned process is an example, and processing unit 502 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above.

Rather, the specific features and acts described above are disclosed as example for embodiments of the invention.

What is claimed is:

1. A system for providing real-time media optimization, the system comprising:
   a memory storage device; and
   a processing unit coupled to the memory storage device, wherein the processing unit is operative to:
   establish a remote session with a remote computing device;
   establish a media path, during the remote session, between a local computing device and the remote computing device, wherein the media path is established without involving a server;
   exchange, during the remote session, non-real-time media data with the remote computing device via the server over a server path;
   exchange, during the remote session, real-time media data with the remote computing device over the media path without involving the server; and
   synchronize the real-time media data from the media path and the non-real-time media data from the server path.

2. The system of claim 1, wherein establish the remote session comprises establishing a hop between a client running on the local computing device and an application running on the server, the established hop being in the server path.

3. The system of claim 1, wherein the media path is between a remote media manager running in a client running on the local computing device and the remote computing device.

4. The system of claim 1, wherein the exchange of the non-real-time media data with the remote computing device over the server path comprises passing non-real-time information to the server in the server path.

5. The system of claim 1, wherein the exchange of the non-real-time media data with the remote computing device over the server path comprises passing non-real-time information to the server in the server path, the non-real-time information comprising information corresponding to a location of the local computing device.

6. The system of claim 1, wherein the exchange of the real-time media data with the remote computing device over the media path comprises exchanging the real-time media data directly between the local computing device and the remote computing device without involving the server in the media path.

7. The system of claim 1, wherein the exchange of the real-time media data with the remote computing device over the media path comprises capturing, encoding, and transmitting the real-time media data.

8. The system of claim 1, wherein the exchange of the real-time media data with the remote computing device over the media path comprises receiving the real-time media data from the remote computing device over the media path, and decoding the real-time media data.

9. The system of claim 1, wherein the exchange of the real-time media data with the remote computing device over the media path comprises modifying network address information for a purpose of remapping one address space into another.

10. The system of claim 1, wherein the exchange of the real-time media data with the remote computing device over the media path comprises exchanging the real-time media data comprising audio and video data.

11. The system of claim 1, wherein the server path and the media path traverse the same network.

12. A method for providing real-time media optimization, the method comprising:
   establishing a remote session with a remote computing device;
   establishing a media path, during the remote session, between a local computing device and the remote computing device, wherein the media path is established without involving a server;
   exchanging, during the remote session, non-real-time media data with the remote computing device via the server over a server path;
   exchanging, during the remote session, real-time media data with the remote computing device over the media path without involving the server; and
   synchronizing the real-time media data from the media path and the non-real-time media data from the server path.

13. The method of claim 12, wherein establishing the remote session comprises establishing a hop between a client running on the local computing device and an application running on the server, the established hop being in the server path.

14. The method of claim 12, wherein the media path is between a remote media manager running in a client running on the local computing device and the remote computing device.

15. The method of claim 12, wherein exchanging the non-real-time media data with the remote computing device over the server path comprises passing non-real-time information to the server in the server path.

16. The method of claim 12, wherein exchanging the non-real-time media data with the remote computing device over the server path comprises passing non-real-time information to the server in the server path, the non-real-time information comprising information corresponding to a location of the local computing device.

17. The method of claim 12, wherein exchanging the real-time media data with the remote computing device over the media path comprises exchanging the real-time media data directly between the local computing device and the remote computing device without involving the server in the media path.

18. The method of claim 12, wherein exchanging the real-time media data with the remote computing device over the media path comprises modifying network address information for a purpose of remapping one address space into another.

19. The method of claim 12, wherein exchanging over the media path comprises exchanging over the media path wherein the server path and the media path traverse the same network.

20. A computer-readable memory storage device that stores a set of instructions which when executed perform a method for providing real-time media optimization, the method executed by the set of instructions comprising:
   establishing a remote session with a remote computing device;
   establishing a media path, during the remote session, between a local computing device and the remote computing device, wherein the media path is established without involving a server;
   exchanging, during the remote session, non-real-time media data with the remote computing device via the server over a server path; and exchanging, during the remote session, real-time media data with the remote computing device over the media path without involving the server synchronizing the real-time media data from the media path and the non-real time media data from the server path.

\* \* \* \* \*